United States Patent Office 3,605,591
Patented Sept. 20, 1971

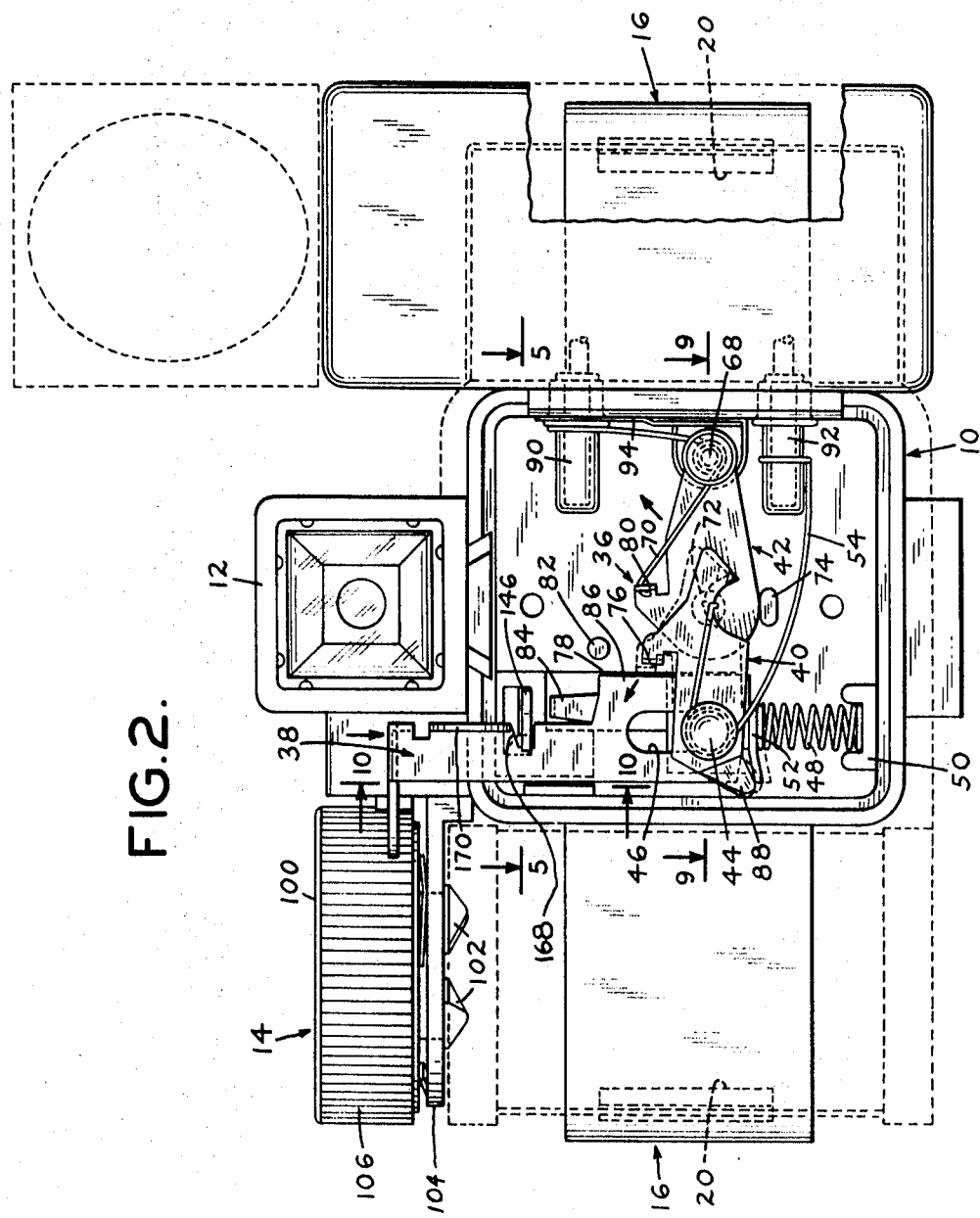

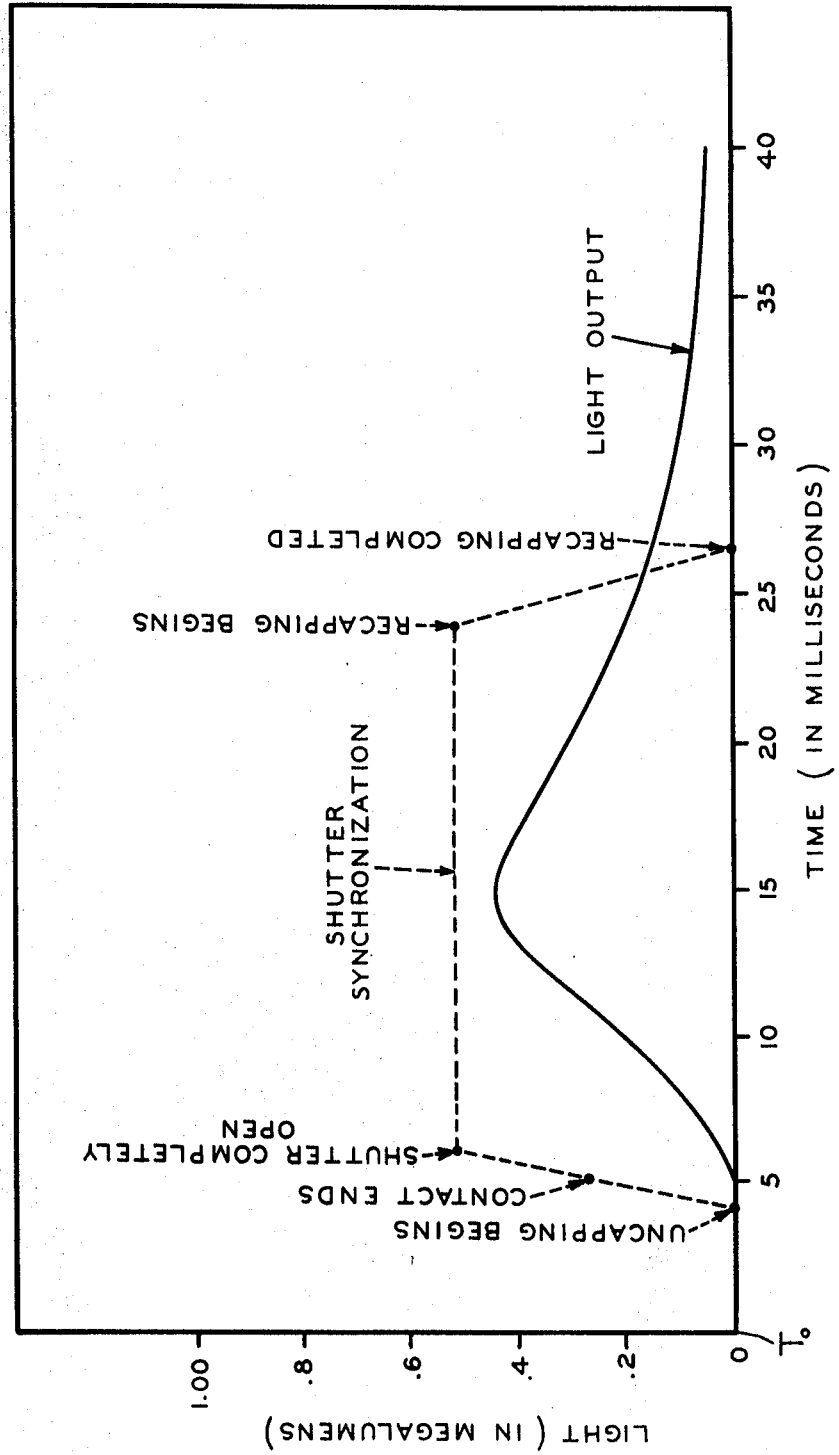

3,605,591
IMPACT SHUTTER HAVING THE TRIPPING AND SHUTTER MEMBERS IN THE FLASH CIRCUIT
Venerio J. Rigolini and Dino A. Liverano, Brooklyn, N.Y., assignors to Whitehouse Products, Inc., Brooklyn, N.Y.
Filed June 6, 1969, Ser. No. 831,016
Int. Cl. G03b 9/70
U.S. Cl. 95—11.5                    14 Claims

ABSTRACT OF THE DISCLOSURE

A photographic camera having an impact shutter mechanism including a tripping member, a shutter and a flash circuit in which both the tripping member and the shutter comprise flash contacts for closing the circuit a predetermined time prior to maximum shutter opening. The springs for operating both the tripping member and the shutter comprise electrical conductors in the flash circuit, and the circuit is closed when the tripping member is in contact with the shutter. Both members are coated with silver to insure good electrical conductivity. Additional conductors are also provided in certain portions of the circuit. The impact shutter mechanism also includes a shutter release member which coacts with a metering pawl to prevent double exposures and lock the film against further winding before each picture is taken after a predetermined amount of unexposed film has been suitably framed for the next picture.

BACKGROUND

This application relates to photographic cameras and more particularly to cameras having an impact shutter mechanism.

Impact shutter mechanisms are known per se and generally include a shutter release member, a shutter tripping member which is movable between a cocked and a released position, means for moving the tripping member from its cocked to its released position in response to actuation of the shutter release member and a shutter member movable to an open position out of capping relation with the aperture of the camera for a predetermined interval of time in response to contact with the tripping member during its movement from its cocked to its released position. One example of this type of mechanism is disclosed in Lawson, U.S. Pat. No. 3,373,670, issued Mar. 19, 1968.

Shutter mechanisms of this type are often used in cameras adapted to receive film cartridges of the so-called "126" size which include spaced parallel spools and a narrow compartment in the cartridge through which film having spaced metering holes is adapted to pass as it is wound off one spool onto the other. One example of a cartridge of this type may be found in Nerwin, U.S. Pat. No. 3,138,081, issued June 23, 1964.

One object of the present invention is to provide a novel and improved electrical flash circuit in a camera having an impact shutter mechanism.

Another object is to provide an improved camera construction which is simple, inexpensive and reliable.

A further object is to provide an improved camera construction for use with 126 size film cartridges in which the cartridge is releasably clipped onto the camera to form part of the camera housing.

Still another object of the invention is to provide a camera having the above flash circuit characteristics with a novel and improved film metering mechanism.

These and other objects, features and advantages of the invention will appear more fully from the following summary and description taken in connection with the drawings.

BRIEF SUMMARY OF THE INVENTION

In one aspect the invention comprises a flash circuit which includes the tripping and shutter members of an impact shutter mechanism in a photographic camera as a pair of electrical conductors comprising flash contacts which close the circuit by contact with one another whenever the shutter is tripped. The contact between these two members closes the flash circuit a pre-determined time prior to maximum shutter opening and also synchronizes the opening of the shutter and the illumination of the flash lamp so that peak illumination occurs in the middle of the period of maximum shutter opening. The tripping member is moved by a spring from its cocked to its released position in response to operation of the shutter release member and it impacts (i.e., contacts) the shutter member during this movement. This spring is electrically conductive and forms part of the flash circuit. In response to this contact the shutter member is moved to an open position out of capping relation with the aperture of the camera for a predetermined interval of time. The length of this interval depends upon the characteristics of the shutter member and the characteristics of the spring which returns it to capping relation with the camera's aperture. This spring is also electrically conductive and forms part of the camera's flash circuit. Both the tripping and shutter members are made of electrically conductive metal which is coated with silver to ensure good electrical conductivity through and between them whenever they are in contact with one another. In addition, in the preferred embodiment the pins around which the tripping and shutter members are pivoted are also electrically conductive members which also form part of the flash circuit. In this embodiment an additional conductor is inserted in the circuit parallel a portion of the spring which determines the length of time the shutter is open.

In another aspect the invention includes a single piece metering mechanism, in combination with the impact shutter and novel flash circuit, which operates locking means for rendering the film advance means inoperative and includes a portion which cooperates with the shutter release member to prevent the impact shutter from operating unless a predetermined amount of film has been advanced to frame a picture for the next exposure.

BRIEF DESCRIPTION OF THE DRAWINGS

FIG. 2 is a vertical elevation view of the embodiment of FIG. 1 with the front cover removed and the shutter mechanism at rest;

FIG. 13 is a graphic representation showing the timing relationship between the opening of the shutter and the closing of the flash circuit.

DETAILED DESCRIPTION OF THE INVENTION

Figure 1:
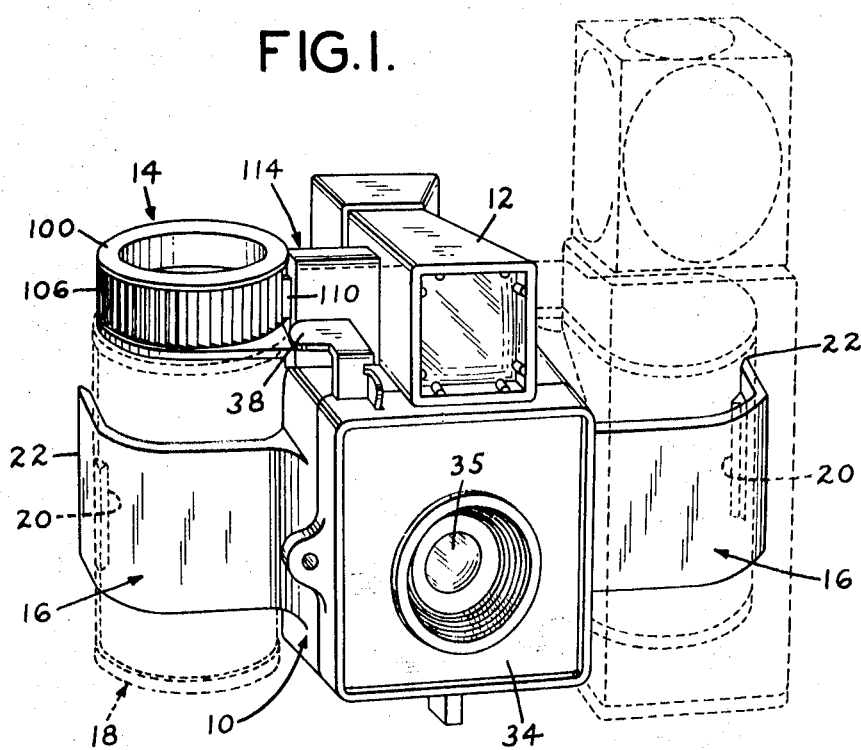
FIG. 1 is a front perspective view of the preferred embodiment of a camera according to the invention with a flash unit, film cartridge and an attached flashcube shown in dashed lines.

Referring now more particularly to FIGS. 1–5 and 9 of the drawings, a camera according to the preferred embodiment of the invention comprises a camera body 10 on which is mounted a viewing device 12 known per se and a film winding mechanism 14. Attached to opposite sides of the body 10 is a pair of curved arms 16 which are adapted to embrace a film cartridge 18 (shown in dashed lines) of the type disclosed in the aforementioned U.S. Pat. 3,138,081. The camera body 10 is releasably clipped onto the cartridge 18 by a lug 20 mounted on each of the arms 16 adjacent their ends 22.

Figure 5:
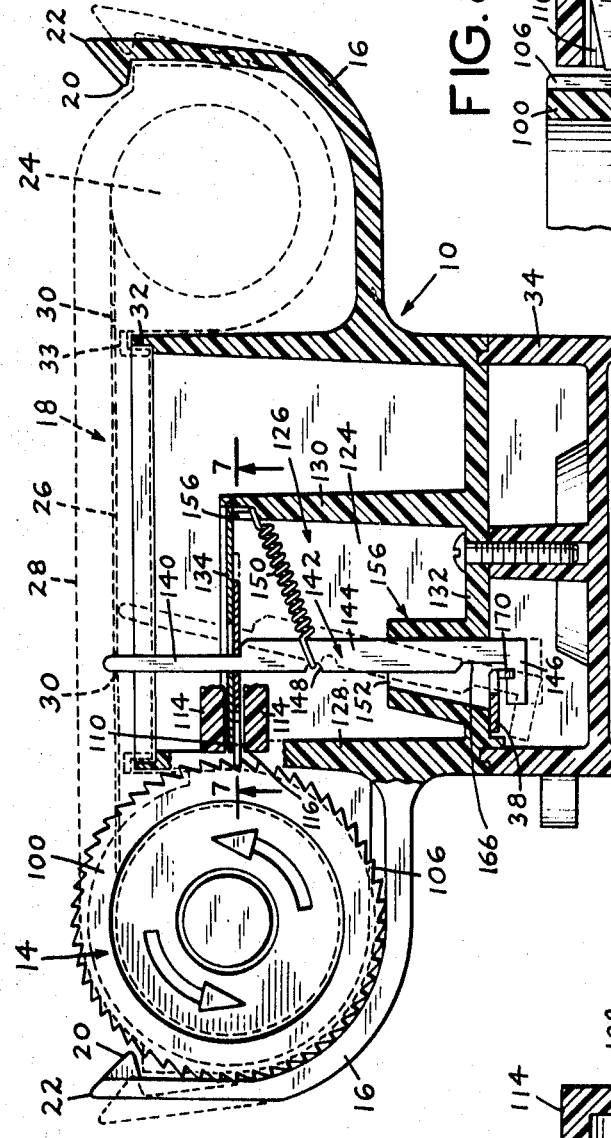
FIG. 5 is a cross-section view of the FIG. 2 embodiment of the invention taken generally along line 5—5 of that figure and showing the film metering member and locking pawl in a locking position.
Figure 7:
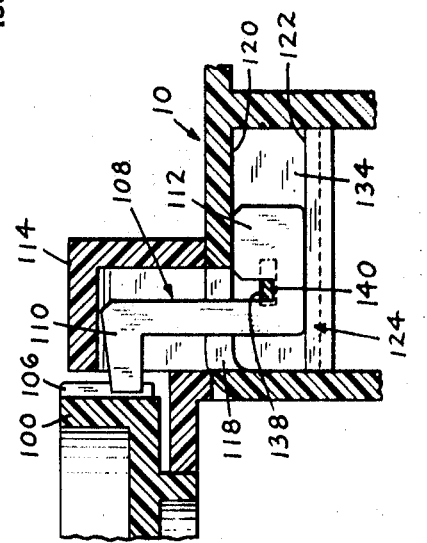
FIG. 7 is a vertical elevation view of a portion of the locking pawl taken on line 7—7 of FIG. 5.
Figure 9:
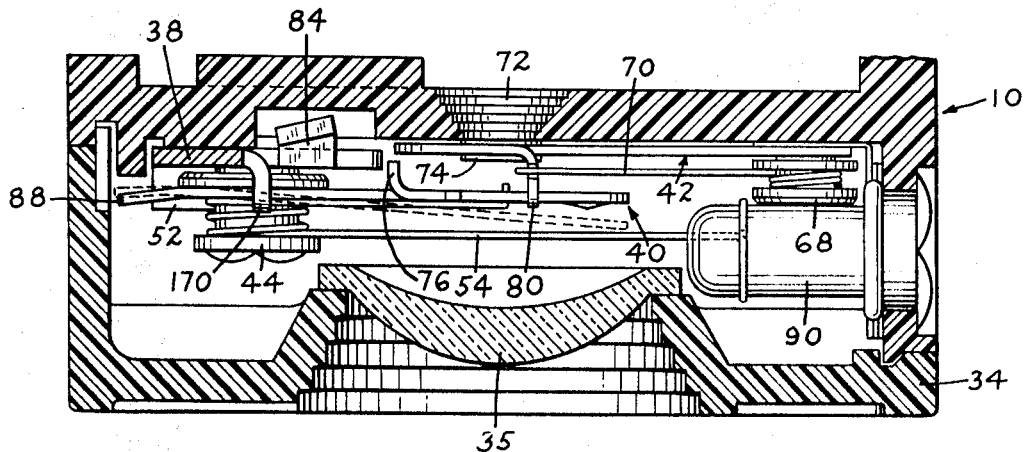
FIG. 9 is a plan view of the FIG. 2 embodiment taken generally along line 9—9 of that figure.
Figure 6:
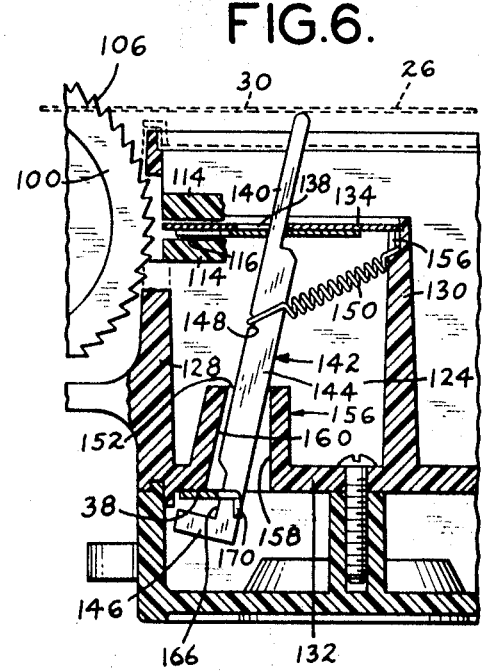
FIG. 6 is a cross-section view of a portion of FIG. 5 with the metering member and locking pawl in their rest positions.

Referring now to FIGS. 1 and 5, as disclosed in U.S. Pat. 3,138,081, cartridge 18 contains a film supply spool 24 at one end and a take-up spool (not shown) at the opposite end. The film 26 is threaded through a flat hollow body portion 28 and is provided with a plurality of perforations 30 which are useful in framing an unexposed portion of the film with respect to the camera for taking successive pictures. The camera body 10 is made light tight with respect to the cartridge 18 by a rectangular rib 32 on the camera body and a mating recess 33 in the cartridge.

Mounted on the front of the camera body 10 is a cover 34 containing a light admitting lens 35. Behind the cover 34 lies the shutter mechanism 36 (on FIG. 2) which includes a shutter release member 38, a tripping member 40 and a shutter member 42. The shutter release member 38 is slidably mounted about an electrically conductive brass pin 44 along its slideway 46 so as to be movable in a vertical direction (see FIGS. 2–4). The tripping member 40 is rotatably mounted about pin 44 in front of the shutter release member 38 and is biased into its cocked position as seen in FIG. 2 by contact with a bottom portion 52 of the shutter release member 38. This contact is produced by a compression spring 48 which drives the shutter release member upwardly and is mounted between a cup 50 fixed to the bottom of the camera body 10 and the bottom surface of the shutter release member 38. A spring 54 mounted around pin 44 between the tripping member 40 and the shutter release member 38 urges the tripping member 40 in a counterclockwise direction about the pin.

The shutter member 42 is pivotally mounted parallel and adjacent but spaced behind the tripping member 40 about an electrically conductive brass pin 68. It is urged in a counterclockwise direction about this pin into capping relation with camera aperture 72 by a spring 70. A stop 74 also mounted on the camera body 10 prevents the spring 70 from driving the shutter member 42 beyond the aperture 72.

Figure 12:
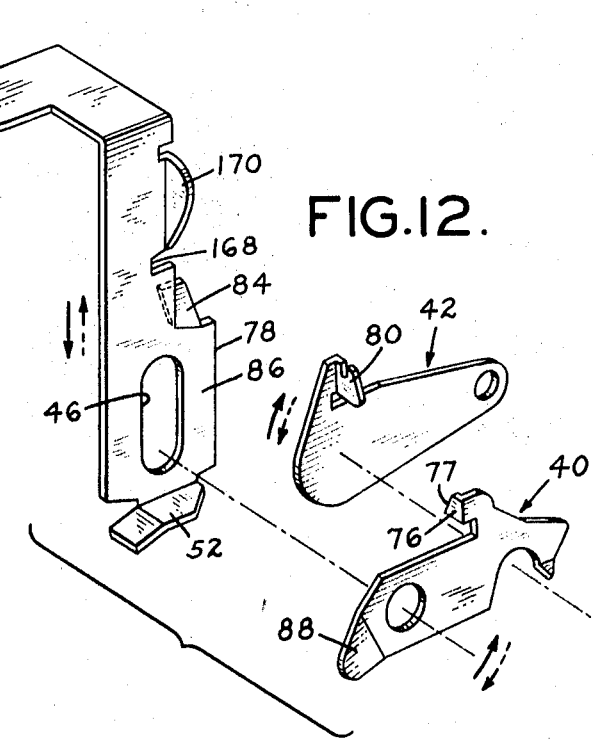
FIG. 12 is an exploded isometric view of the shutter release member, the shutter member and the tripping member in their positions relative to one another.
Figure 3:
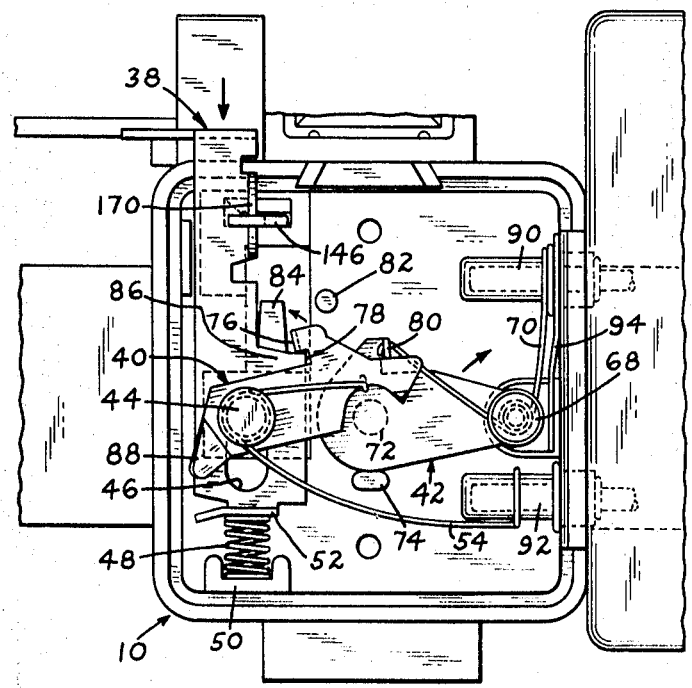
FIG. 3 is a vertical elevation view of a portion of FIG. 1 embodiment showing the positions of the tripping member and the shutter member at the moment of impact or contact when they complete the flash circuit.
Figure 4:
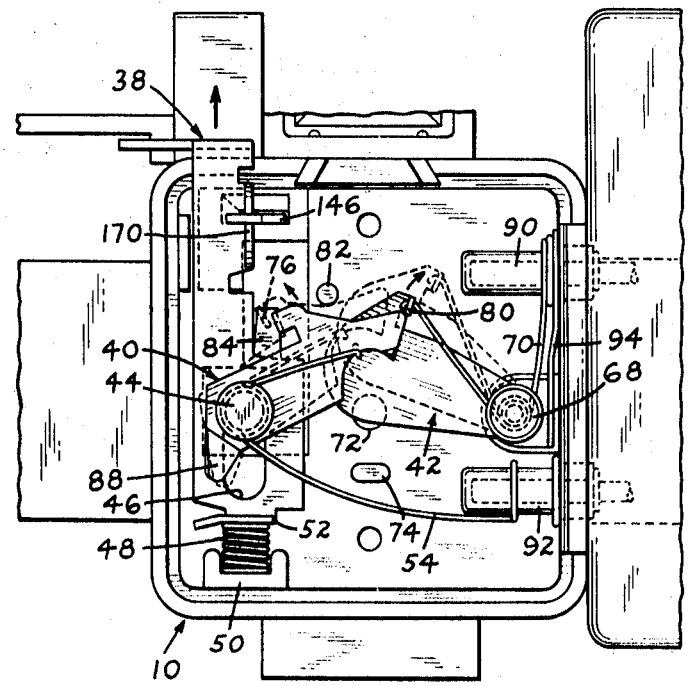
FIG. 4 is a vertical elevation view similar to FIG. 3 showing the positions of the tripping and shutter members at the end of their period of contact. One of their disengaged positions a moment later is shown in dashed lines.
Figure 8:
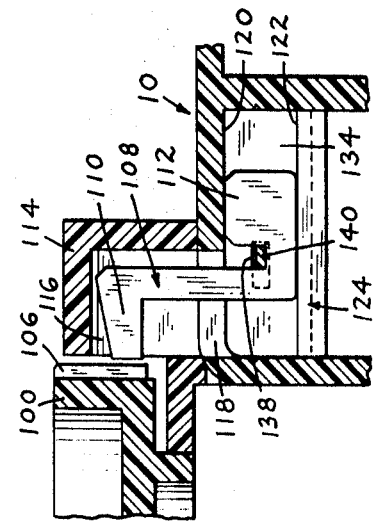
FIG. 8 is a vertical elevation view similar to FIG. 7, but showing the locking pawl in a disengaged position.

Referring now to FIGS. 2, 3 and 4, depression of the shutter release member 38 actuates the shutter mechanism as follows: As shown in dashed lines in FIG. 2, as the shutter release member 38 is depressed, its bottom 52 moves away from the tripping member 40 allowing the spring 54 to rotate this member counterclockwise a few degrees until its leg 76 rests against the edge 78 of the shutter release member 38. Further depression of this member 38 moves the edge 78 downwardly until it passes leg 76 and frees or releases the tripping member 40 for rotation out of its cocked position. The tripping member 40 then rotates counterclockwise under the influence of the spring 54, contacts finger 80 attached to the shutter member (see FIGS. 3 and 12), and starts to drive the shutter clockwise about pin 68 (see FIG. 2). Further counterclockwise movement of the tripping member 40 causes the shutter member to begin to uncap aperture 72 and expose the film 26 in the camera. After still further rotation while the aperture becomes fully uncapped, due to the momentum of the shutter, the tripping member separates from the shutter and comes to rest against a stop 82 mounted on the camera body 10. In this position the tripping member leg 76 has climbed up onto a ramp 84 forming part of the shutter release member as seen in dashed lines in FIG. 4. As seen in FIG. 12, leg 76 has an inclined edge 77 which facilitates the leg climbing onto the ramp.

After a predetermined interval of time following separation of the shutter member from the tripping member spring 70 halts the clockwise rotation of the shutter 42 and returns it in a counterclockwise direction into capping relation with the aperture 72.

When the shutter release member is released spring 48 moves it upwardly causing leg 76 to slide along ramp 84 to its forward face 86 and along this face until pin 44 reaches the end of a slideway 46. In this position the bottom 52 of shutter release member 38 contacts tripping member leg 88 (see FIGS. 2 and 12) and rotates this member clockwise a few degrees until leg 76 slips over edge 78 and returns to its initial cocked position.

In the preferred embodiment the flash circuit of the camera is adapted for electrical connection with a remote flash devivce by means of two sockets 90, 92. One half of this electrically conductive circuit includes shutter member 42, spring 70 and pin 68 and the other half includes spring 54, pin 44 and tripping member 40. Spring 54 is preferably made of 0.15 inch diameter silver plated beryllium-copper wire and is heavy enough to carry the required electrical current from socket 92 to tripping member 40, though some of the current also passes to the tripping member through pin 44. Spring 70 is also preferably made of silver plated beryllium-copper wire, but is only .007 inch in diameter in order to give the proper timing characteristics to the shutter member 42. Though this spring electrically connects terminal socket 90 with shutter 42, because of its diameter it does not carry sufficient electrical current to energize an AG–1 flash bulb of the type used in flashcubes. To insure sufficient current carrying capacity, therefore, a parallel current path is provided by an electrical conductor 94 connected between socket 90 and pin 68. With this construction current reaches shutter 42 not only through spring 70, but also through pin 68.

Referring now more particularly to FIGS. 2–4 and 13 the synchronization of the shutter and the closing of the flash circuit will be described. After depression of the shutter release member 38 and following a short counterclockwise rotation of the tripping member 40 this member is released and while moving counterclockwise contacts the shutter member 42 and closes the flash circuit. As seen in FIG. 13 approximately $4 \times 10^{-3}$ seconds later the shutter starts to uncover aperture 72. Using AG–1 flash bulbs, such as are used in flashcubes and the light emitting characteristics of which are known, by the time a total of about $5 \times 10^{-3}$ seconds has passed the filament in the flash bulb has ignited and the tripping member 40 begins to separate from the shutter 42 (see FIG. 4) thus opening the flash current again. After separation, the momentum of the shutter causes it to continue its clockwise rotation for a time, fully uncapping aperture 72 after a total of about $6.5 \times 10^{-3}$ seconds has elapsed since the initial contact was made. Spring 70 eventually overcomes the momentum of the shutter and causes it to begin to recap the aperture beginning about $23.5 \times 10^{-3}$ seconds after the tripping member has contacted the shutter. Recapping is completed about $3 \times 10^{-3}$ seconds later. In the meantime, beginning at about $5 \times 10^{-3}$ seconds, light is given off by the flash bulb and reaches a peak at about $15 \times 10^{-3}$ seconds after the flash circuit is closed. This light tapers off to about 30–35% of its peak value by the time the shutter closes. By thus synchronizing the peak of the illumination in the center of the period during which the shutter is fully open, a maximum amount of light from the flash bulb is usable in taking pictures. With an AG–1 flash bulb and the shutter mechanism of this invention about 83% of the light from the bulb is given off while the shutter is open.

Referring now to FIGS. 1, 2, 5–8, 10 and 11 the film advance and metering aspects of the camera will be described. The film advance mechanism 14 includes a winding knob 100 which has a plurality of teeth 102 depending from it for engagement with the film take-up spool (not shown) in the cartridge 18. Knob 100 is rotatably mounted in a ring-like portion 104 of the camera body in such a way as to be rotatable only in a counterclockwise direction (as shown by the arrows in FIG. 5) when viewed from above. The knob also has a plurality of teeth 106 extending axially along its peripheral edge which aid in grasping the knob for winding the film and also serve to assist in locking the knob in a fixed position when it has been rotated sufficiently to frame an unexposed portion of the film for the next picture.

Figure 10:
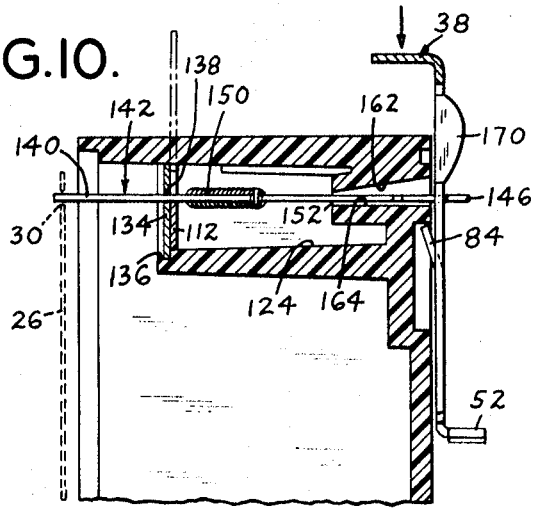
FIG. 10 is a partial side view in cross-section of the FIG. 2 embodiment taken generally along line 10—10 of that figure and showing the shutter release member at rest.
Figure 11:
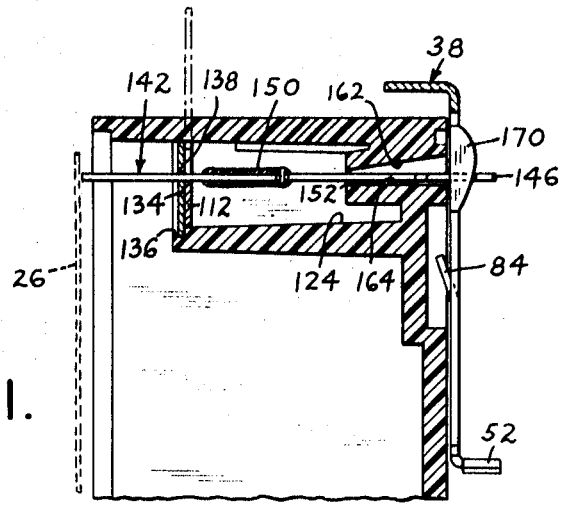
FIG. 11 is a partial side view in cross-section similar to FIG. 10, but showing the shutter release member depressed.

Locking of this knob is accomplished by a locking pawl 108 having a locking portion 110 and a driven portion 112. The locking portion 110 of pawl 108 is enclosed on the top and on three sides by a housing 114 which extends upwardly from the camera body 10 behind the shutter release member 38 and between the viewing device 14 and knob 100. Housing 114 defines an opening 116 (see FIG. 8) adjacent knob 100 through which the locking portion 110 of pawl 108 is adapted to reciprocate toward and away from the knob. In addition, there is a narrow opening 118 in housing 114 and camera body 10 through which locking portion 110 connects with and is reciprocated by driven portion 112. Portion 112 fits closely between the lower surface 120 of an upper portion of the camera body 10 and the upper surface 122 of a shelf 124 which is spaced below surface 120. These two surfaces form the top and bottom walls of a chamber 126 (see FIG. 5) which is further defined by side walls 128, 130 forming part of camera body 10 and front and back walls 132, 134. Back wall 134 comprises a metal plate which is fixedly mounted between surface 120 and a stepped portion 136 of shelf 124 as seen in FIGS. 10, 11. Plate 134 contains an opening 138 through which the sensing finger portion 140 of a film metering member 142 extends.

Metering member 142 serves two primary functions, namely, that of operating the locking pawl to control the advance of film as knob 100 is rotated and that of preventing the camera from making double exposures. Metering member 142 is mounted within chamber 126 for this purpose and comprises a flat piece of sheet metal with a middle portion 144, an L shaped front portion 146 and the sensing finger 140 already mentioned which comprises its rear portion. A notch 148 is formed in the middle portion 144 of the metering member for connection with one end of a tension spring 150. The other end of spring 150 is attached to a rear portion 156 of the right hand side wall 130 of chamber 126 (see FIG. 5) causing the spring to urge the metering member rearwardly and toward side wall 130.

The front portion 146 of the metering member extends through an opening 152 in front wall 132 for cooperation with the shutter release member 38. Opening 152 is formed by a rearwardly extending protrusion 156 which extends from wall 132 and comprises walls 158, 160, 162, and 164 which form the opening as a trapezoidal chamber when seen in plan (see FIG. 5) or in profile (see FIG. 10) views. Between the front and middle portions 146, 144 of the metering member 142 is a narrow section 166 which cooperates with a notch 168 (see FIGS. 2 and 12) in the shutter release member to prevent double exposures.

In operation the metering member performs its functions in the following manner. After an exposure has been made, sensing finger 140 is urged against the film 26 by spring 150 which also keeps the locking pawl 108 in its unlocked position (see FIGS. 6 and 8) and pivots the middle portion 144 of metering member 142 against wall 158 so that the narrow section 166 of the member fits into the shutter release member's notch 168 thus preventing the member from being depressed and making another exposure (see FIG. 6). Knob 100 is then rotated counterclockwise until the sensing finger 140 is driven into a passing film perforation 30 (see FIG. 10) by spring 150. Further winding of knob 100 after this occurs causes finger 140 to move with the film toward the winding knob thus driving the locking pawl 108 into its locking position (see FIGS. 5 and 7) in which it engages teeth 106 on the knob 100 and pivots the metering member counterclockwise a few degrees about wall 158 so as to remove its narrow section 166 from notch 168 so the next exposure can be made (see FIG. 5). Thereafter as the shutter release member 38 is depressed its rib or cam 170 contacts the L shaped front portion 144 of the metering member and drives it forward (see FIG. 11) until the sensing finger 140 is removed from its film perforation 30. As soon as this occurs spring 150 pulls the metering member and thus the locking pawl 108 away from knob 100 and urges narrow section 100 toward the shutter release member so that when it returns to its normal position the narrow section will be driven into notch 168 again and the cycle will be complete.

Though the invention has been described in connection with an embodiment in which a remote flash unit is connected with the camera by a pair of electrical terminal sockets it will be obvious that a flash synchronization device of the type described is usable in cameras having integral flash devices as well as with those using remote devices. In addition it should be clear that though the springs connected with the tripping and shutter members and these members themselves are preferably coated with silver to ensure good electrical conductivity on contact with each other, any other means for ensuring good conductivity may be substituted. A silver coating is the preferred technique, however, because its oxide is electrically conductive while that of other metals is not. Naturally the pins about which the tripping and shutter members pivot need not be limited to being made of brass material. They should however be adequately electrically conductive to carry the required current.

What is claimed is:

1. A camera having an impact shutter mechanism including a release member, a shutter member and a tripping member having a cocked and a released position, said tripping member being driven from said cocked to said released position upon movement of said release member to a tripping position wherein said tripping member trips the shutter, and an electrical circuit for firing a flash lamp in timed relation to the operation of said shutter mechanism in which circuit said tripping and shutter members form electrical conductors.

2. Apparatus according to claim 1 wherein said shutter member includes a finger portion which is contacted by said tripping member during operation of the impact shutter mechanism and said contact closes and completes said circuit.

3. Apparatus according to claim 2 wherein said tripping and shutter members are coated with silver.

4. Apparatus according to claim 2 wherein said shutter mechanism includes a spring which drives the tripping member from its cocked to its released position and said spring comprises an electrical conductor in said circuit and is electrically connected with said tripping member.

5. Apparatus according to claim 2 wherein said shutter member is driven to an open position out of capping relation to the camera's aperture for a predetermined interval of time by the impact of said tripping member during operation of said shutter mechanism and said mechanism includes a spring connected with said shutter member which controls the length of time said member is out of capping relation with said aperture and said spring comprises an electrical conductor in said circuit and is electrically connected with said shutter member.

6. A camera having an impact shutter mechanism comprising a shutter release member, a tripping member which is released by said release member and a shutter member which is tripped by said tripping member and an electrical circuit for firing a flash bulb in timed relation with the operation of said shutter mechanism, the improvement wherein said shutter member and said tripping member both form electrical conductors in said circuit, wherein said shutter member includes a finger portion which is contacted by said tripping member during operation of the impact shutter mechanism and said contact closes and completes said circuit, and there are means for electrically connecting both said members to a flash unit.

7. Apparatus according to claim 6 wherein said camera includes a pair of electrical terminals to which a remote flash unit may be connected, means electrically connecting one of said terminals with said tripping member and means electrically connecting the other of said terminals with said shutter member.

8. Apparatus according to claim 7 wherein said means electrically connecting one of said terminals with said tripping member comprises a spring connected to both said terminal and said tripping member and which is adapted to drive said tripping member from a cocked to a released position when the shutter mechanism is operated.

9. Apparatus according to claim 7 wherein said means electrically connecting the other of said terminals with said shutter member comprises a spring connected with said other terminal and said member which controls the interval of time during which the shutter is out of capping relation with the camera's aperture.

10. Apparatus according to claim 9 wherein said shutter is pivotally mounted about an electrically conductive pin and there are means other than said spring electrically connecting said other terminal with said pin.

11. Apparatus according to claim 9 wherein said tripping member and said shutter are coated with silver.

12. Apparatus according to claim 6 wherein there is a film metering mechanism which cooperates with said shutter release member for proventing double exposures and for halting the advance of film in the camera when sufficient unexposed film has been framed for taking the next picture.

13. Apparatus according to claim 12 wherein said metering mechanism includes a one-way rotatable film winding knob on the texterior of the camera, a one-piece metering plate mounted within the camera for cooperation with the shutter release member, and a locking pawl operated by said metering plate to engage said knob and halt its rotation at predetermined stages in the operation of the camera.

14. Apparatus according to claim 13 wherein said metering plate has a sensing finger portion at one end and a double exposure prevention portion adjacent its opposite end and is mounted so as to pivot on a portion intermediate its two ends.

References Cited
UNITED STATES PATENTS 3,181,443   5/1965   Lareau et al. _____ 95—11.5

SAMUEL S. MATTHEWS, Primary Examiner

M. L. GELLNER, Assistant Examiner

U.S. Cl. X.R.

95—31, 59